United States Patent [19]

Cahill et al.

[11] Patent Number: 4,712,306

[45] Date of Patent: Dec. 15, 1987

[54] FIBER OPTIC EARTH ROTATION GYRO COMPASS

[75] Inventors: Richard F. Cahill, El Toro; Jeffrey A. Eck, Yorba Linda; Gerald L. Schwantz, Stanton; John P. Theriault, Fountain Valley; Philip A. Turek, Huntington Beach; Eric Udd, Huntington Beach; Raymond E. Wagoner, Huntington Beach; Keith H. Wanser, Huntington Beach, all of Calif.

[73] Assignee: McDonnell Douglas Corporation, Long Beach, Calif.

[21] Appl. No.: 813,721

[22] Filed: Dec. 27, 1985

[51] Int. Cl.[4] .............................................. G01C 19/64
[52] U.S. Cl. ....................................... 33/304; 356/350
[58] Field of Search ................... 33/304, 312, 313, 302; 356/350

[56] References Cited

U.S. PATENT DOCUMENTS

| 4,299,490 | 11/1981 | Cahill | 356/350 |
|---|---|---|---|
| 4,450,406 | 5/1984 | Bobb | 324/247 |
| 4,542,647 | 9/1985 | Molnar | 33/304 |
| 4,588,296 | 5/1986 | Cahill | 356/350 |
| 4,594,790 | 6/1986 | Engebretson | 33/304 |

Primary Examiner—Harry N. Haroian
Attorney, Agent, or Firm—Benjamin Hudson, Jr.; George W. Finch; John P. Scholl

[57] ABSTRACT

A fiber-optic rotation sensor particularly adapted to be placed adjacent a drill head to measure the orientation of a drill string with respect to the axis of rotation of the earth during or after drilling for minerals such as oil and gas. The analog sensor is based on a Sagnac interferometer and uses light beams counterrotating in one or more oblong circular shaped coils of optical fiber in which dual phase modulators are used to generate an AC signal to enable detection of a rotation rate output. The sensor also includes means to mechanically or electrically flip the sensitive axis of the rotation sensor to null out bias drift. If one coil is used, the flipping is in 90° segments. When two coils at 90° to each other are used, they are flipped 180°.

24 Claims, 32 Drawing Figures

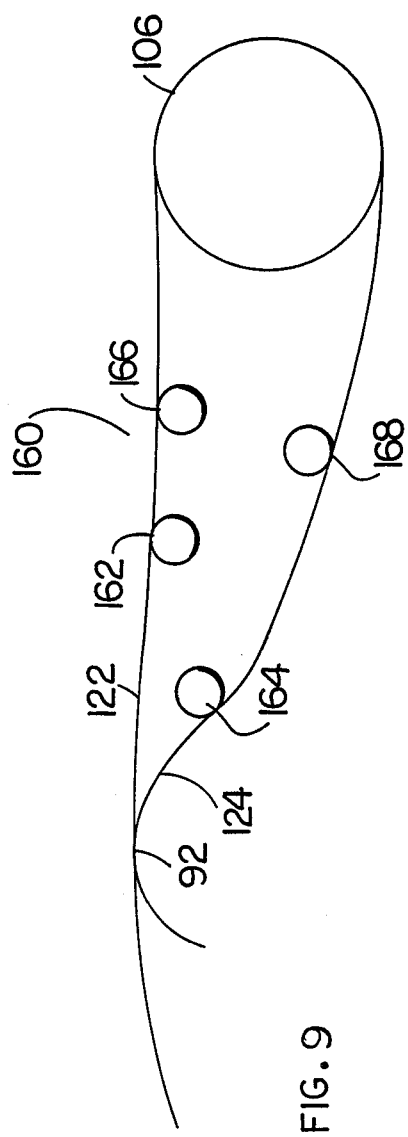
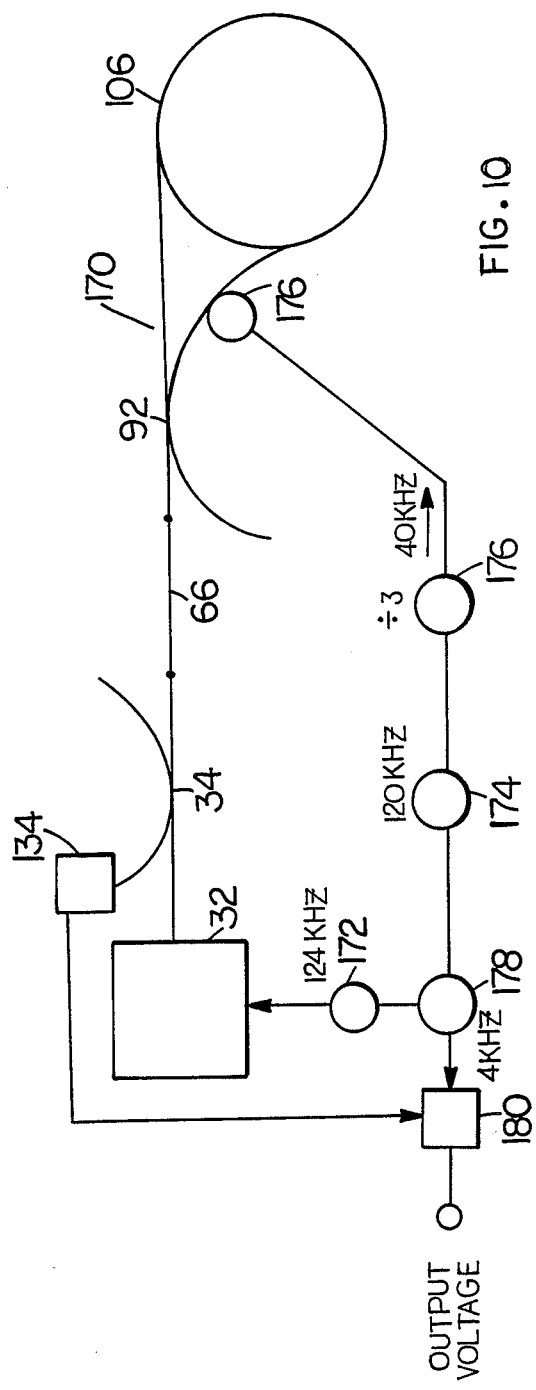
FIG. 9
FIG. 10

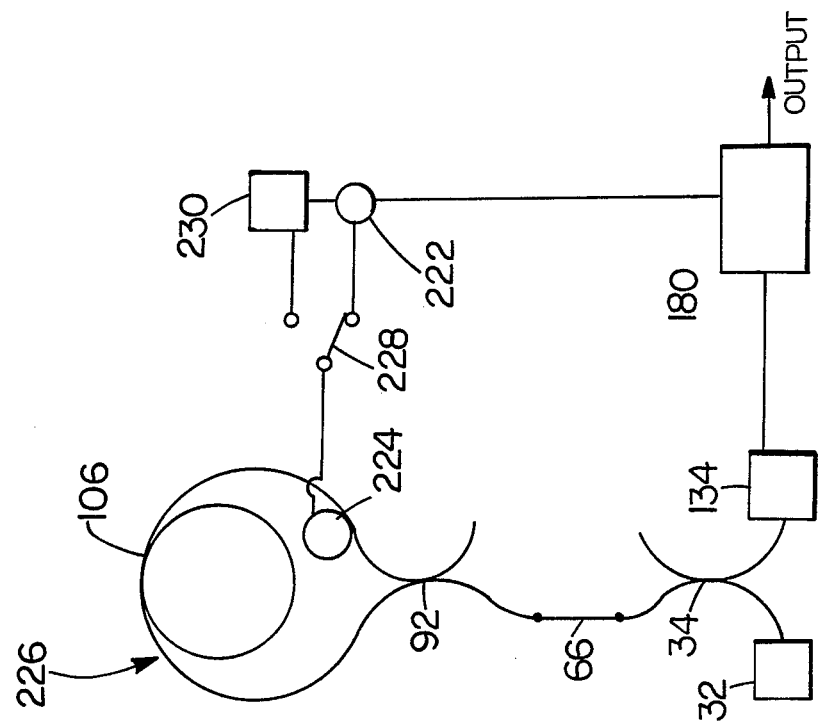
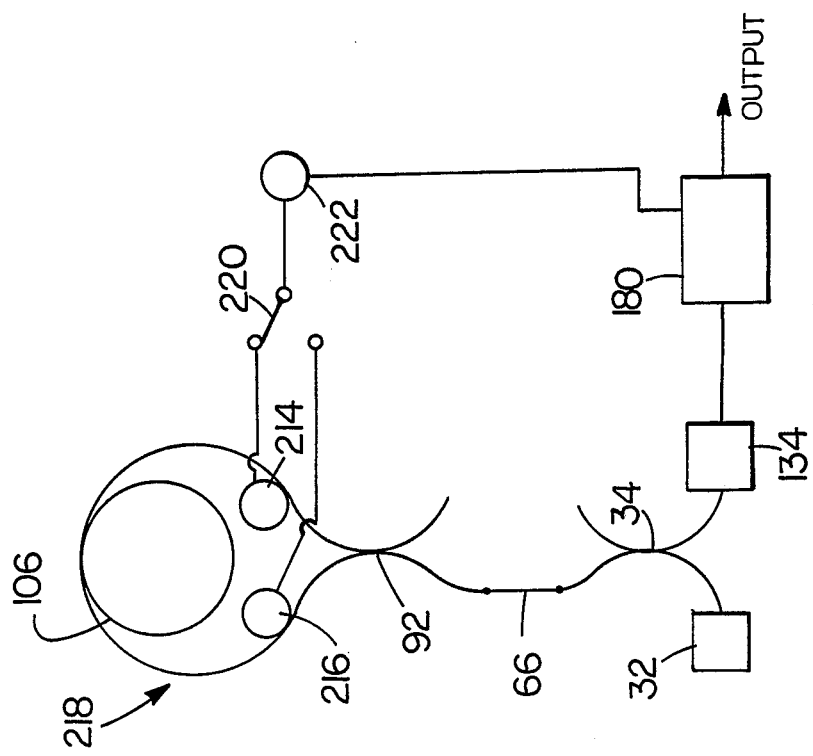

FIBER OPTIC EARTH ROTATION GYRO COMPASS

CROSS REFERENCE TO RELATED PATENT AND APPLICATIONS

This application is related to U.S. patent application Ser. No. 309,254 filed Oct. 7, 1981 for, "Improved Compact Optical Gyro" now U.S. Pat. No. 4,588,296 and Ser. No. 648,831 filed May 16, 1983 for, "Optical Sensor with Intensity Optical Fiber Maintenance", all by Richard F. Cahill and Eric Udd and assigned to the assignee of the instant application.

BACKGROUND OF THE INVENTION

Conventional borehole survey technology involving the use of either magnetic or gyroscopic instruments has provided at best a lateral position uncertainty of 1% of the measured well depth. The conventional instruments also exhibit severe accuracy degradation in inclined boreholes, even though some recent mechanical instruments use modern inertial navigation and guidance techniques. As outlined in, "Analysis of Alternate Borehole Survey Systems" by S. Brezkowski and J. Fagan in the *Journal of The Institute of Navigation,* Vol. 30, No. 4, 1983-1984, page 309-324, such mechanical instruments are difficult and expensive to adapt to the severe environment at the downhole end of a drill string. Details of some such instruments are provided in U.S. Pat. Nos. 4,265,028 entitled "Survey Apparatus And Method Employing Canted Tilt Sensor" by Van Steenwyk, 3,753,296 entitled "Well Mapping Apparatus And Method" by Van Steenwyk, 4,245,498 entitled "Well Surveying Instrument Sensor" by Poquette, Jr., 4,192,077 entitled "Survey Apparatus And Method Employing Rate-of-Turn And Free Gyroscopes" by Van Steenwyk, et al, 4,199,869 entitled "Mapping Apparatus Employing Two Input Axis Gyroscopic Means" by Van Steenwyk and 4,197,654 entitled "Survey Apparatus And Method Employing All Latitude, All Attitude Gyrocompassing" by Van Steenwyk, et al. Since such devices are mechanical, they require large amounts of power, and in adverse environments, tend to fail at inopportune times requiring the removal of the entire drill string, an especially expensive and time consuming process when deep wells are involved.

Therefore there has been a need for a bore hole survey instrument that can be placed adjacent to the drill head, can withstand the extreme environment to which such drill heads are exposed, is reliable, takes little power and can be constructed relatively economically and does not require that the surrounding drill string is non-magnetic.

Conventional mechanical gyro cannot survive the oil drilling environment so that accurate surveys can only be made by removing the entire drill string and then running gyroscopes, of the conventional mechanical spinning type, down the hole as a survey tool. The only way measurement while drilling is currently done is with magnetometers and they suffer from two major defects. Magnetic anomalies in the earth can cause errors that may be large in unfavorable locations, and in order for the magnetic steering tool to function, it must be encased in a non-magnetic drill section, usually stainless steel. Unfortunately stainless steel is brittle and has a tendency to shear with the resultant loss of the drill bit and instrument package. In addition, the cost of pulling up the string and sending it back down may be more than $1,000,000.

SUMMARY OF THE INVENTION

In the present invention, a Sagnac interferometer is adapted as a gyro for placement adjacent the drill head of a drill string where it is used to measure the effect of the earth's rotation and thereby measure the inclination of the hole. Alternatively, a similar tool may be used to survey the borehole after it has been drilled. The environmental requirements on such a tool are less severe than that imposed on the measurement while drilling tool. In the gyro, a light source is coupled into one end of a four-end fiber beamsplitter. One of the output ends thereof directs the light into a polarizer. The light then is split by a central beamsplitter into counterpropagating beams that propagate in opposite directions about a coil of fiber configured as an oblong circular shape so that it will fit within the physical constraints of the drill hole. The fiber of the coil back to the central beamsplitter is the rotationally sensitive portion of the system. Phase modulators are positioned adjacent the opposite ends of the fiber coil to generate AC signals for determination of the rotation rate. The two beams are recombined by the central beamsplitter and are directed after passage through the polarizer element to an output detector by the fiber beamsplitter. One approach uses two of these coils with their axes sensitive to rotation mounted 90° apart are provided in the gyro. In that case, a mechanical flipper is used to flip the sensitive axes of the rotation sensors by 180° in order to reduce bias drift to very low levels. A more economical approach for use in stable environments uses one coil and a device to flip its axis in 90° steps to null the bias drift. Usually, the sensor package is slipped into a section of drill pipe immediately behind the drill head. Alternatively, the package may be dropped down the borehole after drilling. The rotation sensor then is used to determine the local rotation which compared to the location of the axis of the earth indicates the orientation of the drill bit from local vertical. It senses north based on the earth's rotation rather than magnetic north which drifts and whose measurement is further degraded by magnetic anomalies in the earth's crust. It is therefore an object of the present invention to provide a solid state gyro compass sized to fit within an oil well pipe for orienting the drill bit thereof during a drilling operation.

Another object is to provide a fiber-optic gyro which can operate within narrow physical constraints in extremely adverse environments.

Another object is to provide a fiber-optic gyro accurate enough to measure the local effect of the earth's rotation so that its physical relationship can be determined with respect to the earth's rotation axis and local vertical.

Another object is to reduce bias drift in fiber-optic rotation sensors.

Another object is to eliminate the sensitivity of fiber optic gyros to small temperature changes.

Another object is to provide improved modulation means for fiber optic gyros.

These and other objects and advantages of the present invention will become apparent to those skilled in the art after considering the following detailed specification together with the accompanying drawings wherein:

BRIEF DESCRIPTION OF THE DRAWINGS

FIG. 9 is a diagrammatic view of a multiple frequency, multiple pair of phase modulators modification for the gyro of FIG. 1;

FIG. 10 is an analog fiber-optic gyro, using electrical mixing to beat down the demodulation signal;

FIG. 16 shows the analog gyro of FIG. 1 with balanced dual phase modulators in combination with the switch driver to reverse the sense of the optical output thereof;

FIG. 17 is a similar diagrammatic view similar to FIG. 16 where only one phase switched phase modulator is used to reverse the sense of the optical output;

FIG. 23 is an enlarged cross-sectional view of a portion of a fiber-optic coil used in the gyro of FIG. 18 showing how the optical fibers are parted to minimize thermal gradients.

BRIEF DESCRIPTION OF THE PREFERRED EMBODIMENTS

Figure 1:
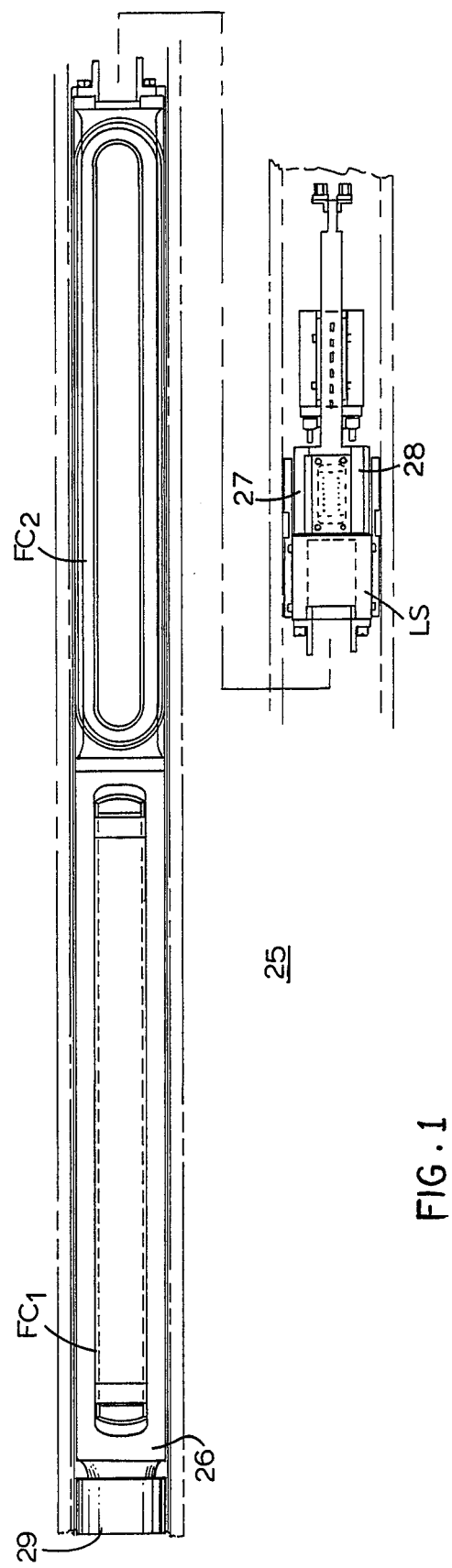
FIG. 1 is a side view of a sensor constructed according to the present invention adapted for placement in a drill string.

Referring to FIG. 1 a gyro 25 adapted for use in a drill string adjacent the drilling head for orientation thereof is shown. The fiber-optic rotation sensor gyro compass 25 includes fiber coils FC₁ and FC₂ mounted at 90° with respect to each other. The coils FC₁ and FC₂ have an oblong circular shape so that they can fit down the narrow confines of a drill string. The coils FC₁ and FC₂ are mounted on an optics mount 26 which on one end thereof are included a superradiant diode light source L$_S$ and the detectors 27 and 28. The entire optics mount 26 is rotatable through 180° by means of a connection to a stepper motor 29 which rotates the entire gyro 25 through 180°. This rotation is periodic to offset bias drift in the output signal. As will be explained in more detail hereinafter the fiber optic gyro compass 25 produces an output signal which indicates the plane of the earth's spin axis or azimuth while the drill string is inserted into the bore hole. The output of the gyro is processed with the output of an accelerometer (not shown but well known in the art) to determine the azimuth direction of the tilt of the drill string.

Figure 2:
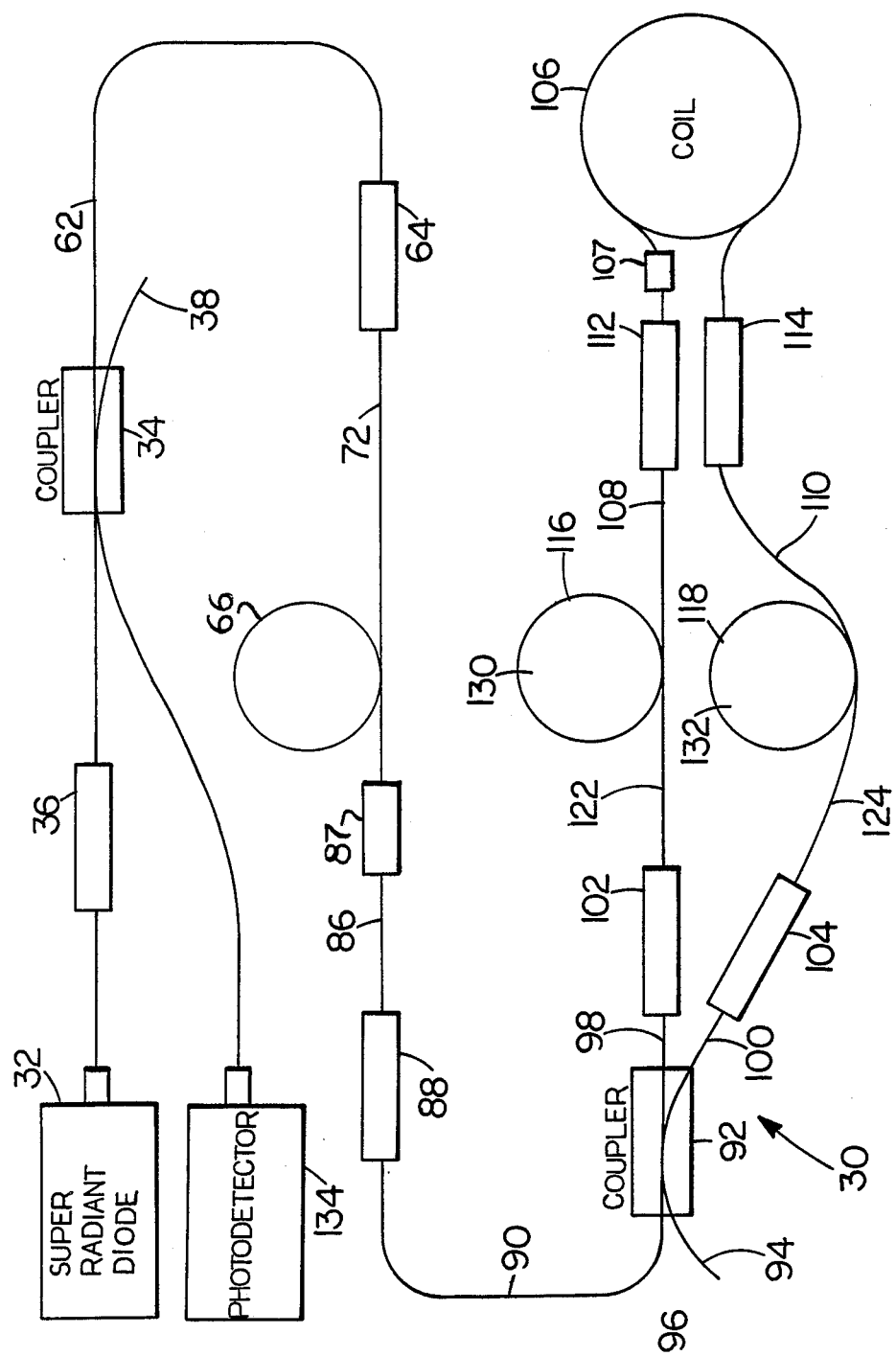
FIG. 2 is a block diagram of an analog fiber-optic gyro constructed according to the present invention.

FIG. 2 refers to a schematic representation of the analog fiber-optic gyro that may be used as the basis for a fiber-optic rotation sensor gyro compass to guide drill heads in drilling operations as illustrated at 30. The analog fiber optic gyro is generally of the type disclosed in the U.S. Pat. No. 4,299,490 issued Nov. 10, 1981 for, "Phase Nulling Optical Gyro"; and U.S. patent application Ser. Nos. 309,254 filed Oct. 7, 1981 for, "Improved Compact Optical Gyro" and 648,831 filed May 16, 1983 for, "Optical Sensor with Intensity Optical Fiber Maintenance", all by Richard F. Cahill and Eric Udd and assigned to the assignee of the instant application. Inasmuch as the analog fiber optic gyro is of the type disclosed in the aforementioned patents and applications to which reference is made to incorporate herein the complete description of structure and operation, the following description is limited to those portions essential to the present invention. The gyro 30 includes a light source 32 which may be a super radiant laser or light emitting diode coupled into a fiber beamsplitter 34 by a suitable splice 36. Fiber couplers 34 usually are constructed by fusing together a pair of optical fibers. In this instance, one end 38 of an optical fiber 38 is not needed so it is terminated in a manner herein after described which prevents back reflected light. In some instances, the end 38 would be connected to a detector so that the output of the light source 32 could be monitored.

Figure 3A:
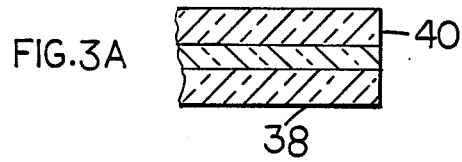
FIGS. 3A, 3B, 3C, 3D, 3E, 3F, 3G, 3H, 3I and 3J are enlarged detailed view of terminations of fiber ends.
Figure 3F:
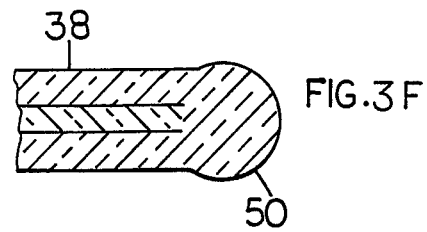
Figure 3B:
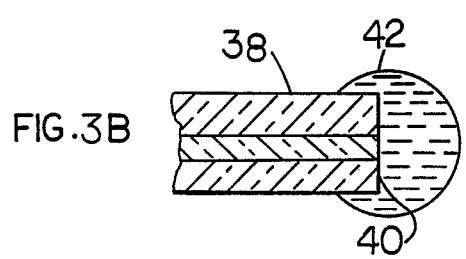
Figure 3G:
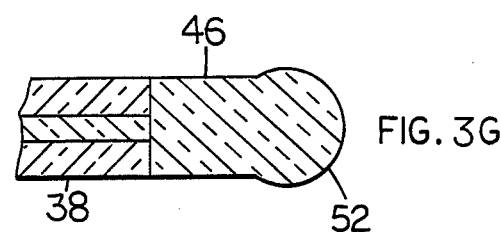
Figure 3C:
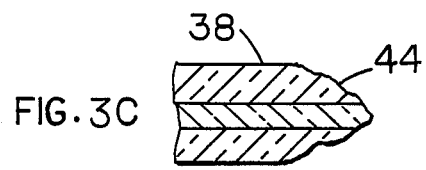
Figure 3H:
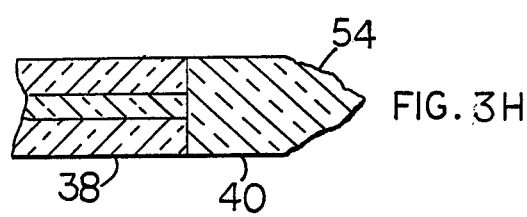
Figure 3D:
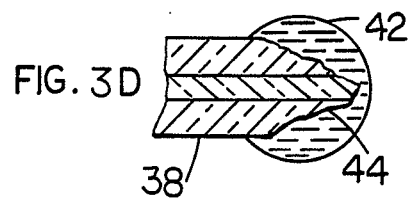
Figure 3I:
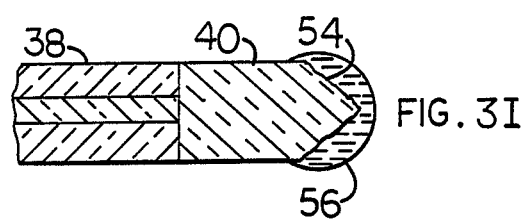
Figure 3E:
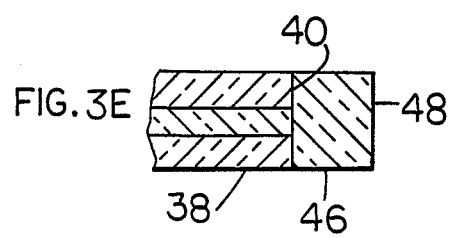
Figure 3J:
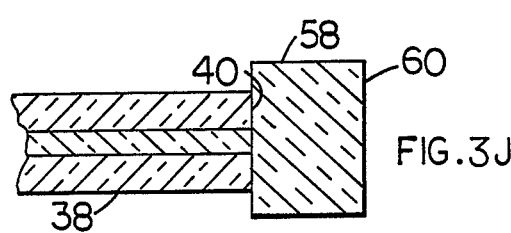

If, as shown in FIG. 3A, the end 38 is merely cleaved forming a right angle surface 40 to interface with the surrounding air, any light striking the surface 40 will be back reflected through the coupler 34, raising the overall noise level of the gyro 30 and degrading its performance. This back reflection of the surface 40 may be reduced by applying a blob 42 of index matching fluid or epoxy to the end 40, as shown in FIG. 3B, crushing the end 44 as shown with fiber 38c in FIG. 3C, or a combination of the two effects, as shown in FIG. 3D, wherein the blob 42 of index matching fluid or epoxy is applied to the crushed end 44. Generally, index matching fluid or epoxy is impossible to perfectly match to a fiber end, and a small amount of back reflection results. To overcome these limitations, the end surface 40 of the fiber 38 may be fused to a glass rod or a large core diameter multimode fiber 46 whose core is much larger than the fiber core to be terminated using such techniques as arc fusion. In this case, the glass from the fiber 38 and the glass rod 46 are mixed and the indexes nearly perfectly match so that back reflection is reduced to very low levels. While only a fraction of the light that enters the glass rod 46 and reflects off its end surface 48 could be expected to reenter the fiber end 38, this may be further minimized by terminating the glass rod 46 in a variety of ways. For example, in FIG. 3F, the end surface 40 of the fiber end 38 has been melted into a glass ball 50 which acts like a relatively large diameter glass rod after melting, but also includes a spherical end which scatters the light in various directions to prevent it from reentering the fiber 38. In FIG. 3G, the same effect has been applied, only the end surface 48 of the large diameter glass rod 46 has been melted into a spherical end surface 52. Other methods include providing the rod 46 with a crushed end 54, as shown in FIG. 3H, or as shown in FIG. 3I, by further including index matching fluid or epoxy 56 at the crushed end 54. The back reflection can also be minimized by splicing the end 40 of the termination 38 to a very large oversized glass element 58 whose end 60 can have all of the aforementioned treatments.

The other output end 62 of the coupler 34 is connected by a splice 64 to a polarizer 66. After being conditioned by the polarizer 66, the beam of light passes a length of polarization preserving fiber 87 that is spliced at 45 degrees to the polarizing fiber 66 to scramble the polarization prior to entering the fiber coil which reduces magnetic field sensitivity. Another splice 88 couples the output of the fiber 87 into one fiber arm 90 of a fiber coupler 92. The coupler 92 has a fiber arm 94 with a terminated end 96 similar to terminated end 38 to prevent undesirable back reflections in the gyro 30. The light beam is split by the coupler 92 to travel out the opposite side output fibers 98 and 100 thereof which are connected by means of splices 102 and 104 respectively to a rotation sensitive coil 106 by means of fibers 108 and 110 and splices 112 and 114.

A pair of phase modulators 116 and 118 are shown with the fibers 108 and 110 respectively formed therearound. The modulators 116 and 118 are placed symmetrically with respect to the coupler 92 and the coil 106. This is advantageous, as they symmetrically heat the fiber coil 106 during turn on to minimize initial bias drift while being able to withstand considerable temperature deviations in service without producing substantial gyro drift. In addition, fiber-optic gyroscopes heretofore have been sensitive to mechanical and acoustical vibrations, and the use of dual phase modulators is helpful in desensitizing the gyro 30 to such physical effects.

Fiber-optic gyroscopes of the prior art utilize a single-phase modulator 116 or 118 near one end of the Sagnac fiber loop 106. This provides means to make the interferometer have maximum sensitivity to rotation as well as allow AC detection of the rotation signal at a convenient frequency. However, several practical problems result when using this scheme. Heretofore, the phase modulators have been annular, PZT types, where a few meters of optical fiber are wrapped around a cylindrical piezoelectric transducer and then connected to the coil 106. If no special precaution is used on the other fiber to match its length from the coupler 92 there will be a lead mismatch between the fiber leads that connect to the fiber coil 106. Also, regardless of how the fiber coil is wound, if the coil is heated uniformly and not the leads, there will be a bias drift. Similarly, when the phase modulator 116 or 118 is turned on, there will be a time dependent heating of the fiber wrapped therearound that will cause bias drift especially during warmup. The amount of PZT heating is highly dependent upon the mounting method used and the operation frequency. Since the fiber wrapped around the PZT is typically in contact with a metalized surface, such as silver, the fiber in the region of the phase modulator will have a different heating or cooling rate than the rest of the fiber in the Sagnac loop when the environmental temperature changes, and this will cause bias drift. Similarly, the PZT expansion coefficient can never exactly match the effective expansion coefficient of the fiber plus its jacket, and once again a uniform temperature change of the entire gyro will cause a time dependent perturbation that is spacially localized and thus lead to gyro drift. Calculations show this latter effect to be large and highly dependent on the glass of the fiber, the jacketing materials and the dimensions.

In the gyroscope 30, the two phase modulators 116 and 118 are constructed to be identical and are placed at what are effectively the opposite ends 122 and 124 of the coil 106 equally distant from the fiber beamsplitter 92. The identical phase modulators 116 and 118 are constructed with an identical lengths of coiled optical fiber wrapped around cylindrical PZT modulators 130 and 132. Preferably the fiber coils in the phase modulators 116 and 118 should be identical, the winding tension of the fibers wrapped around the PZT modulators 130 and 132 should be identical, and any bonding agents that are used to hold the fibers to the modulators 130 and 132 should be the same and should be applied in an identical fashion. In addition, the mounting of the phase modulators 116 and 118 should assure that environmental effects applied thereto are identical, and they should be located as near as possible to each other. Finally, the two modulators 116 and 118 should be excited 180° out-of-phase by the same wave form which is not necessarily sinusoidal. A preferred circuit for the annular PZT's 130 and 132 is shown in detail in FIG. 5. A signal source 133 is applied between ground and the outer ring PZT 130 and the inner ring of PZT 132 while the inner ring of PZT 130 and the outer ring of PZT 132 is returned to ground, as shown. This causes the phase modulators 130 and 132 to operate 180° out-of-phase no matter what the wave form of the signal source 133.

When the modulators 116 and 118 are placed at the opposite ends of the Sagnac fiber loop 106 equi-distant from the beamsplitter 92, a signal wave form that is applied to both modulators 116 and 118 but with 180° phase difference will cause the net modulation to be the sum of the amplitudes of the two modulators 116 and 118. Conversely, a signal wave form that is applied to both modulators 116 and 118 in phase will cause the net modulation to be the difference of the amplitudes of the two modulators 116 and 118. For example, if the two modulators 116 and 118 were driven in phase with equal amplitudes, the two modulations would exactly cancel and produce no net phase modulation of the returning light output through the coupler 92, the polarizer 66, the coupler 34 to a detector 134. This effect is what allows cancellation of the environmental effects that undesirably excite the two modulators 116 and 118. When the two modulators 116 and 118 are mounted in close proximity with a symmetrical mounting, temperature changes will effect both modulators with nearly equal amplitudes and be in phase and thus cancel to a high degree. The same occurs to mechanical and acoustical vibrations. No such cancellation of environmental effects occur with single-phase modulation concepts.

Figure 4:
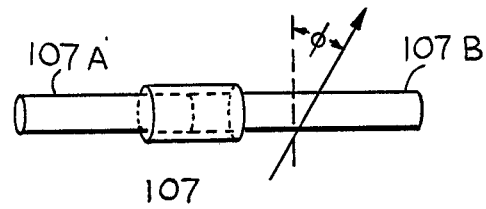
FIG. 4 is an enlarged view of the depolarization submodule for the gyro of FIG. 1.

In order to prevent signal fade out in the system due to the input polarization state dictated by the polarizer 66 changing in the fiber coil 106 to a cross polarization state resulting in the loss of light signal reaching the detector 134, two means for preserving the intensity of the signal may be employed. The first means uses a polarization preserving fiber throughout the system. Usage of the fiber also requires that the coupler 92 be polarization preserving. However, polarization preserving fiber is currently prohibitively expensive. Currently the price is about an order of magnitude higher than conventional single mode fiber which can be prohibitive in systems such as the oil drilling tool which use approximately two kilometers of fiber. Also polarization preserving beamsplitters are currently expensive. To circumvent this problem, a fiber depolarizing element 107 is placed in series with the coil 106. This depolarizing element consists of two lengths of polarization preserving fiber that are spliced with their birefringent axes at 45° with respect to each other as shown in FIG. 4. Other angles are possible, but 45 degrees is optimal. It is important that the lengths chosen for the depolarizing element be long enough so that the birefringence of the polarization preserving fiber in the depolarizer 107 is sufficient to overcome the residual birefringence in the fiber coil 106. Typically, this would mean selection of the depolarizer element lengths 107A and 107B to be about 1% of the length of the coil 106. In this manner the light passing through the coil 106 is scrambled in polarization so that one-half of the light intensity falls back onto the detector 134 after passage through the polarizer 66. The depolarizer unit 107 may be placed through the coil 106, however, since the expansion coefficient of the polarization preserving fiber used in the depolarizer 107 will differ from that of the conventional single mode fiber used in the coil 106 placement near the center of the coil 106 of the depolarizer will minimize bias drift due to changing temperature conditions. Alternatively, two depolarizers may be placed in series with the fiber-optic coil near the location at the splices 102 and 104 for symmetry.

The detector 134 may connect to the coupler 34 by means of a glass rod 135 mounted at an angle to what is normally a highly reflective detector surface, not shown, to avoid back reflections into the gyro 30.

Figure 6:
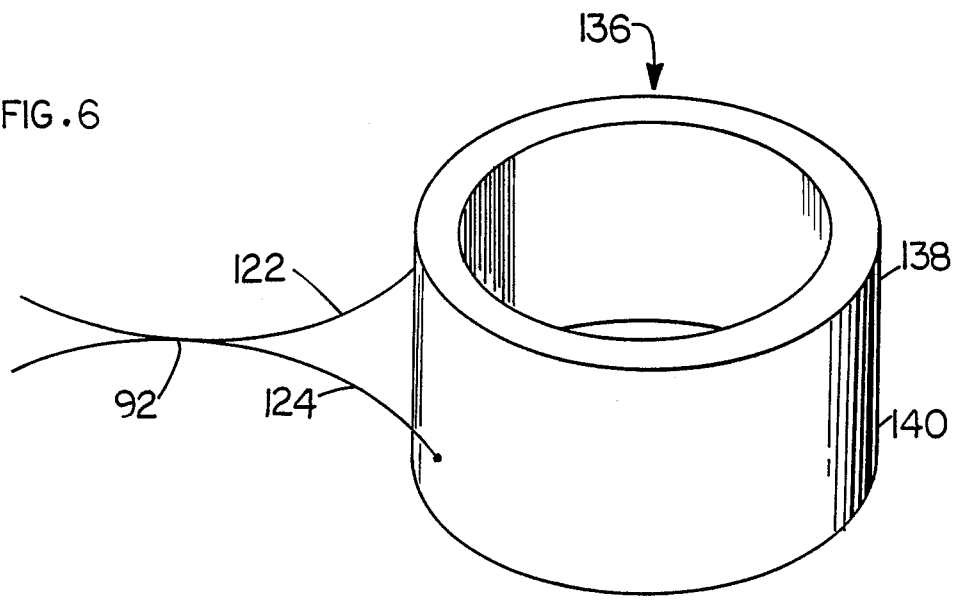
FIG. 6 is a perspective view of a dual element fiber coil with one-half of the coil on a phase modulator.
Figure 7:
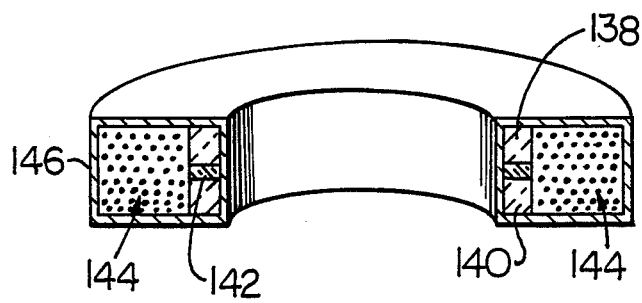
FIG. 7 is a cross-sectional side view of one-half of the coil of FIG. 5.

The entire fiber coil 106 may be wrapped around two large PZT phase dither elements as shown in FIG. 6. This configuration has a number of potential advantages including the reduction of the drive voltage used to obtain an AC output signal indicative of rotation rate and the possibility of operating efficiently at lower frequencies for the output detection signal which allows the usage of less expensive electronic demodulation units. Here, the coil 106, the depolarizer 107, and the two phase modulators 116 and 118 elements may be included in a single assembly 136 which includes a depolarizing element 142 mounted between two large PZT phase modulation elements 138 and 140 stacked upon each other. With regards to element 136 the radially poled annular PZT elements 138 and 140 are wrapped by a fiber coil 144 such that one-half of the coil is about each element. Layers of insulation and shielding material 146 are applied about the exposed extremities thereof so that elements 138 and 140 are as near as possibly exposed to the same environment when stacked together, as shown in FIG. 7.

Figure 8:
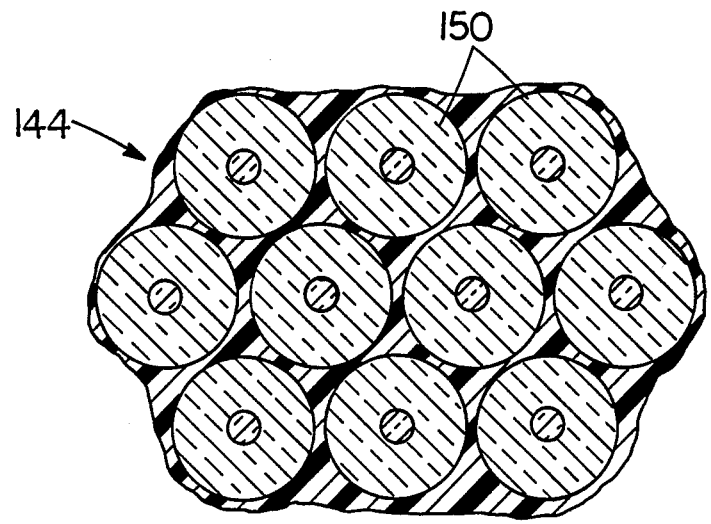
FIG. 8 is a cross-sectional view of the coil construction of FIGS. 5 and 6.

Half of the coil 106 forming the rotationally sensitive portion of the gyro 30 is wrapped about in each element 138 and 140. Thermal gradients between different loops of the fiber 150, as shown in FIG. 8, are minimized by providing thermal potting material 152 between the loops of fiber 150. Glass fiber 150 conducts heat relatively poorly, whereas the potting material 152 chosen for its high thermal conductivity. This further reduces the possibility of thermal gradients within the coil to eliminate the drift that might be caused thereby.

As shown in FIG. 9, there are instances when multiples of more than two-phase modulators are desirable. In gyro 160 which is otherwise similar to gyro 30, phase modulators 162, 164, 166 and 168 are provided on the ends 122 and 124 of the coil 106 adjacent the fiber coupler 92. The phase modulators 162, 164, 166 and 168 may be constructed separately, but closely positioned together or may be constructed each having a fourth of the fiber of the coil 106 wrapped therearound similar to that of assembly 136. However constructed, the modulators 162, 164, 166 and 168 should be constructed with the above-mentioned constraints in mind. That is, care should be taken that the loop from the fiber coupler 92 is symmetric with respect to environmental effects, positioning, and the effects of the phase modulators. The configuration of the gyro 160 of FIG. 9 is advantageous when the modulators 162 and 164 are driven 180° out-of-phase with respect to each other by a first wave form S1 while the second pair of phase modulators 166 and 168 are driven 180° out-of-phase with respect to one another by a second wave form S2. The advantage of this approach is that the detection signals generated by S1 and S2 mix and if properly chosen can form a more convenient demodulation signal, for example S1 minus S2.

In prior art fiber optic gyros it is also possible to generate this kind of signal by mixing light amplitude modulation at signal S1 with the modulated signal S2 generated by a phase modulator in the system. This is shown with respect to single-phase modulator gyro 170, shown in FIG. 10, whose common components with gyro 130 have the same numbers as gyro 130. Here, two oscillators 172 and 174 having operating frequencies of 124 and 120 KHz are connected respectively to the light source 32 and the single phase modulator 176. The signal from the oscillator 174 is shown passing through a divider 176 which reduces it to 40 KHz. This is used for third harmonic detection, but would be removed when first harmonic detection is desired. The output from the oscillator 172 is used to current modulate the superradiant diode light source 132 so that light returning from the coil 106 to the detector 134 has a 4 KHz signal impressed thereupon as shifted by rotation of the coil 106. This signal which is the third harmonic of about 4 KHz as modified by the rotation of the coil 106, is converted into an electrical signal by the detector 134 and fed to a synchronous demodulator 180 which is also fed the output of a differencing mixer 178 also connected to the 124 KHz and 120 KHz outputs of the oscillators 172 and 174 to produce a 4 KHz difference signal. The output voltage of the synchronous demodulator 180 thereafter represents the rotation of the fiber-optic coil 106.

Figure 11:
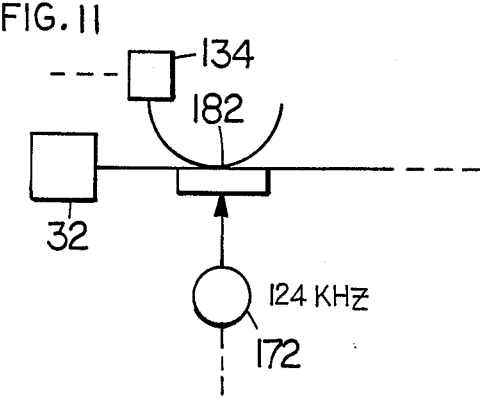
FIG. 11 shows a modified variable beamsplitter for use in the gyro of FIG. 9.

One disadvantage of this approach is that the direct modulation of the light source 32 may adversely affect its performance. Therefore, the light modulation schemes shown in FIGS. 11 and 12 may be employed. In FIG. 11, a variable fiber beamsplitter 182 is substituted for the beamsplitter 34 having the 124 KHz output from the oscillator 172 fed thereto. The variable fiber beamsplitter 182 is used to amplitude modulate the input light signal. The variable fiber beamsplitter 182 essentially allows the splitting ratio to be controlled electronically so that more or less of the light actually passes therethrough or is absorbed at the end 38.

Figure 12:
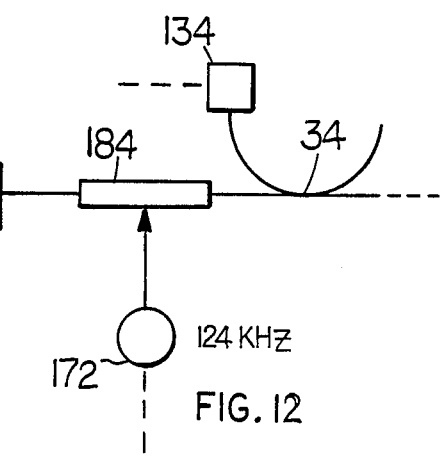
FIG. 12 shows another modification to the gyro of FIG. 10 wherein a variable attenuator is placed between the light source and the first beamsplitter.

In FIG. 12, a variable attenuator 184 positioned between the light source 32 and the fiber coupler 34 is fed the 124 KHz output from the oscillator 172.

Figure 13:
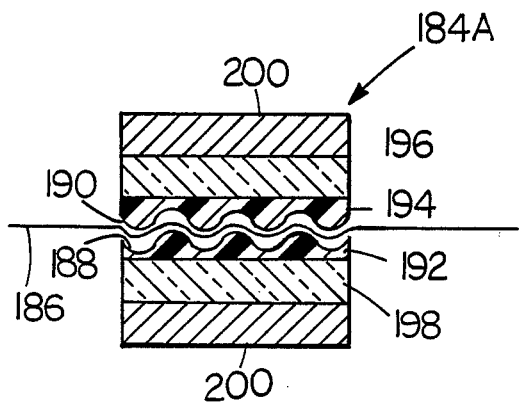
FIG. 13 is an enlarged detailed cross-sectional view of the variable attenuator of FIG. 12.
Figure 14:
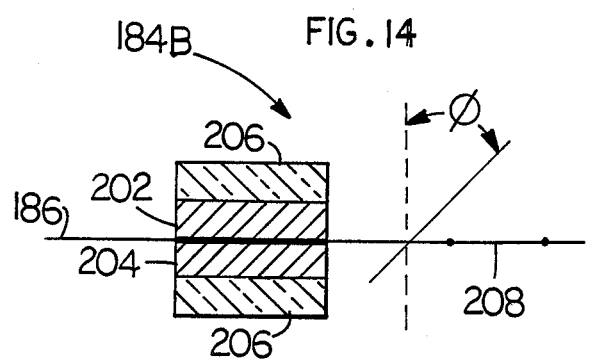
FIG. 14 is a diagrammatic view of another type of variable attenuator which rotates the polarization of light passing therethrough.
Figure 15:
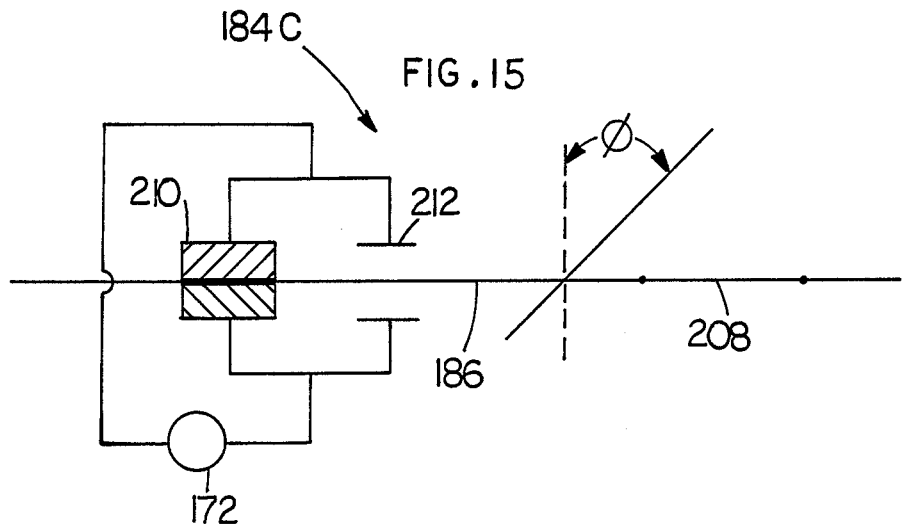
FIG. 15 is another variable attenuator which varies induced birefringence in a fiber polarizer.

Suitable variable attenuators 184a, 184b and 184c are shown in FIGS. 13, 14 and 15. The attenuator 184a is based on microbending. The fiber 186 through which the light to be attenuated is passing is squeezed to conform to the mating bending surfaces 188 and 190 of die blocks 192 and 194 which are forced together by one or two PZT elements 196 and 198 which are restrained from outward movement by a clamp 200. Since such squeezing of a fiber 186 can also affect the birefringence of a length of fiber, on attenuator 184b with one or two PZT elements 202 and 204 held against the fiber 186 by a clamp 206 can be used to shift the polarization angle $\phi$ of the light passing through the fiber 186 prior to its entry into a polarizer such as the fiber polarizer 208, shown in FIG. 14. For optimum performance, the first PZT 202 should be aligned at 45° relative to the polarizer 208. The second PZT 204 is positioned orthogonal to the first so that when the PZTs 202 and 204 are oscillated, the birefringence varies causing the polarization state of the light passing through the fiber 186 to be oscillated. Since the fiber polarizer 208 only transmits one polarization state, the assemblage acts as a variable attenuator 184b.

As shown in FIG. 15, with respect to variable attenuator 184c, the polarization angle shift $\phi$ also may be induced by electrodes 210 and 212 positioned along the fiber 186 at locations where the fiber 186 is coated with a poled electrostrictive material and driven by the oscillator 172. Alternately, the fiber 186 could be formed out of material, such as lithium niobate, with a substantial electrooptic coefficient so that the fiber 186 could be driven directly. The changes in polarization angle $\phi$ caused by the variable birefringence producible between the electrodes 210 and 212 and the fiber affects the intensity of the light passing through the polarizer 208.

As will be discussed hereinafter, rotation of the entire optical head 180° is sufficient to fundamentally eliminate bias drift due to various environmental effects on the gyros 30, 160 and 170, heretofore discussed. It is also possible to partially simulate this effect by switching the sense of a pair of phase modulators 214 and 216, as shown in the gyro 218 of FIG. 16. The modulators 214 and 216 are alternately connected by means of a switch 220 to an oscillating driver 222. The modulators 214 and 216 are symmetrically placed with respect to the coil 106 and the beamsplitter 92 so that alternate operation thereof reverses the sense of the demodulation signal applied thereby. This technique allows for the correction of offsets due to electronics but bias drifts due to the action of the coil 106 itself remain.

It is also possible to accomplish a similar result by using a single-phase modulator 224, as shown in the gyro 226 of FIG. 17, where the modulator 224 is connected by a switch 228 first directly to the driver 222 and then through a 180° delay 230. Although this may be acceptable in a low cost unit, the disadvantage of this approach is there may be nonsymmetric heating of the fiber coil 106 which will result in bias drift.

Figure 5:
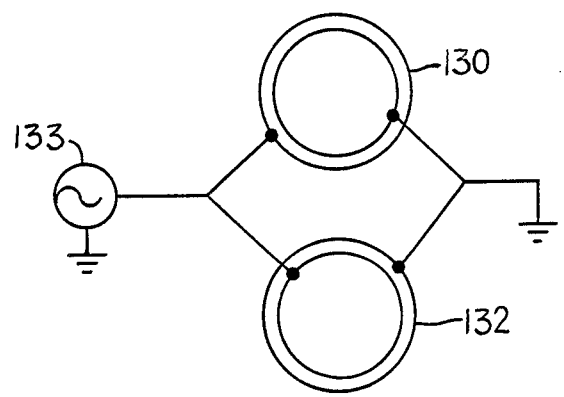
FIG. 5 is a diagram of dual radially poled PZT phase modulators with opposite polarity wiring for 180° out of phase excitation.
Figure 18:
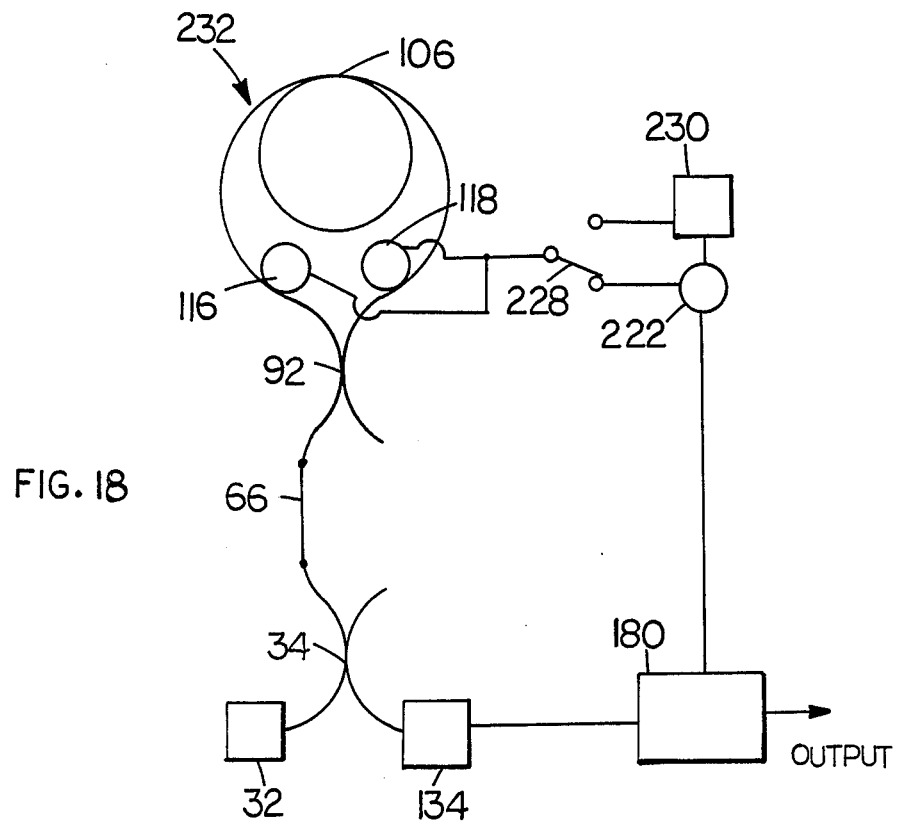
FIG. 18 is a diagrammatic view of a gyro using a dual modulator configuration wired in a manner to switch an 180° phase delay between the modulators.

To circumvent this possible error source, a matched pair of symmetrically place phase modulators 116 and 118, constructed as described above, may be employed in a gyro 232, connected as shown in FIG. 5. The output of the driver 222 is alternately connected by switch 228 directly to the modulators 116 and 118 or through the 180° delay 230, as shown in FIG. 18. Of course, as mentioned above, a dual optical head may be rotated back and forth 180° or a single optical head may be shifted 90° at a time through 360°.

Figure 19:
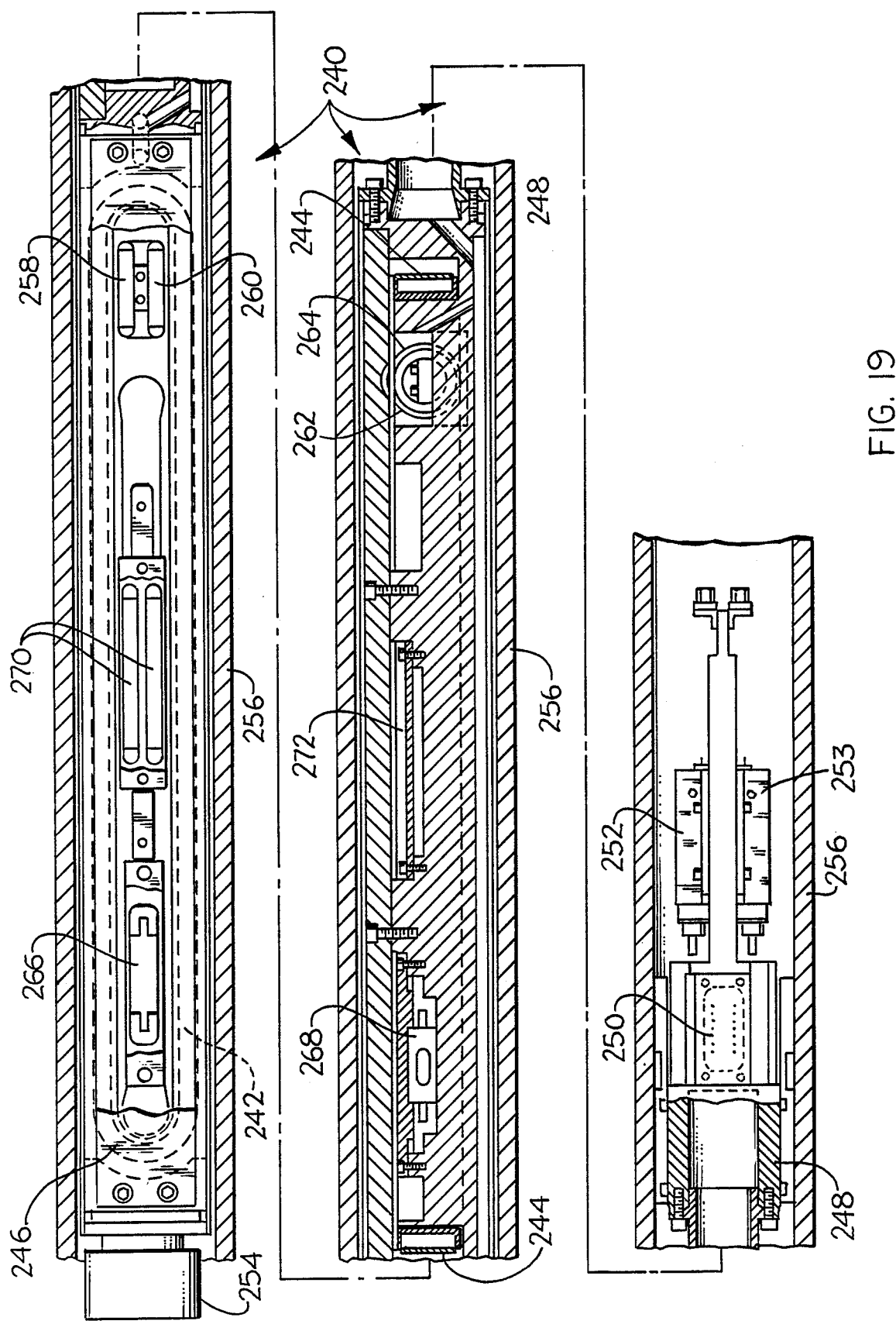
FIG. 19 is a side view of a sensor constructed according to the present invention adapted for placement in a drill string.

An exploded and detailed view of a gyro 240 incorporating the principles of this invention employing the 180° method and adapted for use in a drill string adjacent the drilling head for orientation thereof is shown in FIG. 19. The fiber-optic rotation sensor gyro compass 240 includes fiber coils 242 and 244 mounted at 90° with respect to each other. The coils 242 and 244 have an oblong circular shape so that they can fit down the narrow confines of a drill string. The coils 242 and 244 are mounted on an optics mount 246 which on one end 248 thereof are included a superradiant diode light source 250 and the detectors 252 and 253. The entire optics mount 246 is rotatable through a 180° by means of a connection to a stepper motor 254 which rotates the entire gyro 240 including its protective case 256 through 180°. Periodic flipping of the optics mount and sensing coils minimizes errors due to system offsets and bias drift. Each coil 242 and 244 has its own pair of PZT modulators 258 and 260 and 262 and 264 as well as a polarization scrambling module 266 and 268 and fiber couplers 270 and 272 mounted within the coils 242 and 244.

The electronics to operate the gyro 240 usually are in a separate container adjacent the case 256. For accuracy, the superradiant laser diode is cooled and driven to a constant light power level. The PZT modulators 258, 260, 262 and 264 must be modulated at a constant frequency and constant voltage. The output signal of the detector 252 contains the rotational information in the amplitude of the harmonics of the PZT drive frequency while even harmonics are at a fixed amplitude that is approximately five orders of magnitude greater than the signal amplitude for small rotation rates. This unusual spectral output requires a very narrow filter with a large gain in the pass band. The signal must then be demodulated to give a voltage output proportional to the rate of rotation.

Figure 20:
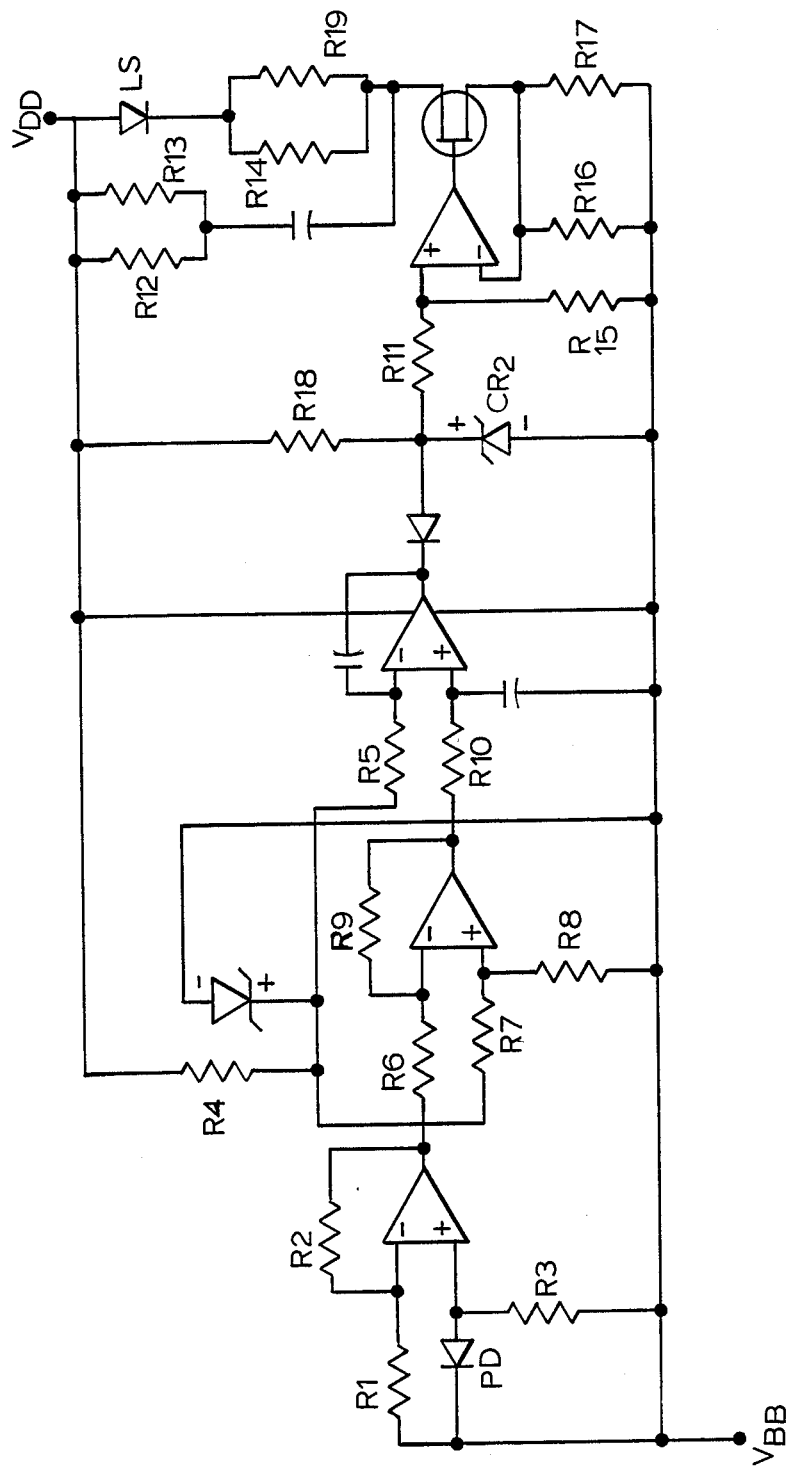
FIG. 20 illustrates the laser driver circuit for the sensing gyro.

Referring to FIG. 20, the laser driver circuit for the sensing gyro is shown which supplies a current to the laser diode and maintains a constant power output. A reference diode $CR_2$ and the resistors $R_{11}$ and $R_{15}$ set the fixed voltage across the parallel combination $R_{16}$ and $R_{17}$. All of the current needed for the voltage drop across $R_{16}$ and $R_{17}$ is supplied by the source $V_{DD}$ and all the current passes through the laser diode LS. The output of the superradiant laser diode LS is controlled by placing a photo diode, PD, near the laser chip, LS, which sends back a current to the circuit through $R_3$. The voltage across $R_3$ is subtracted from the fixed voltage set by the reference $CR_1$ and the divider network of $R_7$ and $R_8$. The signal then passes through a low pass filter to a signal diode $CR_3$. When the laser power drops the reference circuit is unbalanced which causes more current to pass through the laser LS until the laser power increases to bring the reference back into balance.

Figure 21:
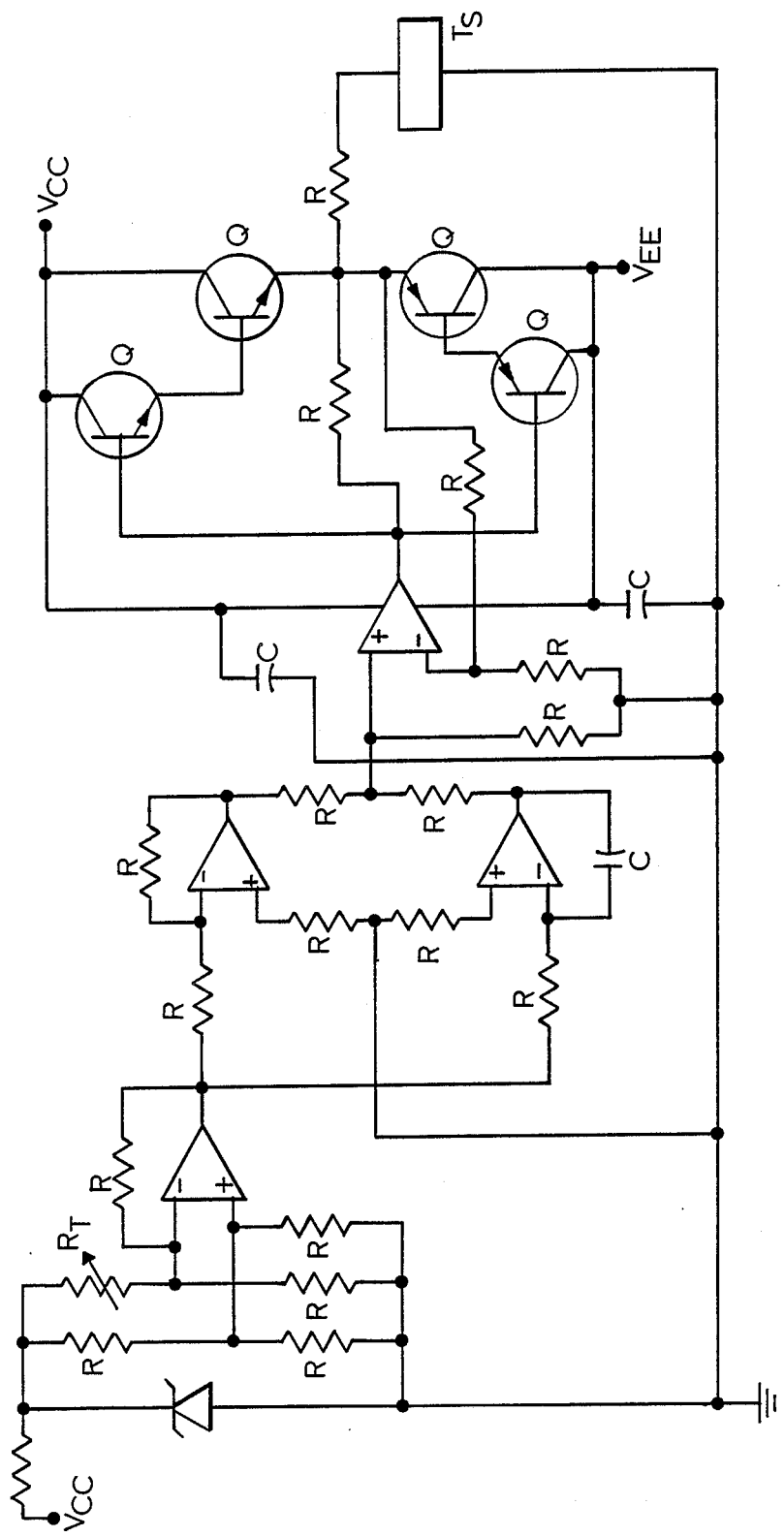
FIG. 21 illustrates the thermoelectric cooler circuit that monitors the temperature of the laser diode.

Referring to FIG. 21 there is a thermoelectric driver circuit that monitors the temperature of the laser diode. The diode LS is cooled by means of a thermoelectric cooler $T_S$. The cooler $T_S$ is controlled by a thermistor $R_T$ located on the laser package which forms part of a bridge network. When the temperature of the thermistor $R_T$ is too high an error signal is produced which is amplified and fed into the high current output stage of the cooler to reduce the temperature thereof.

Figure 22B:
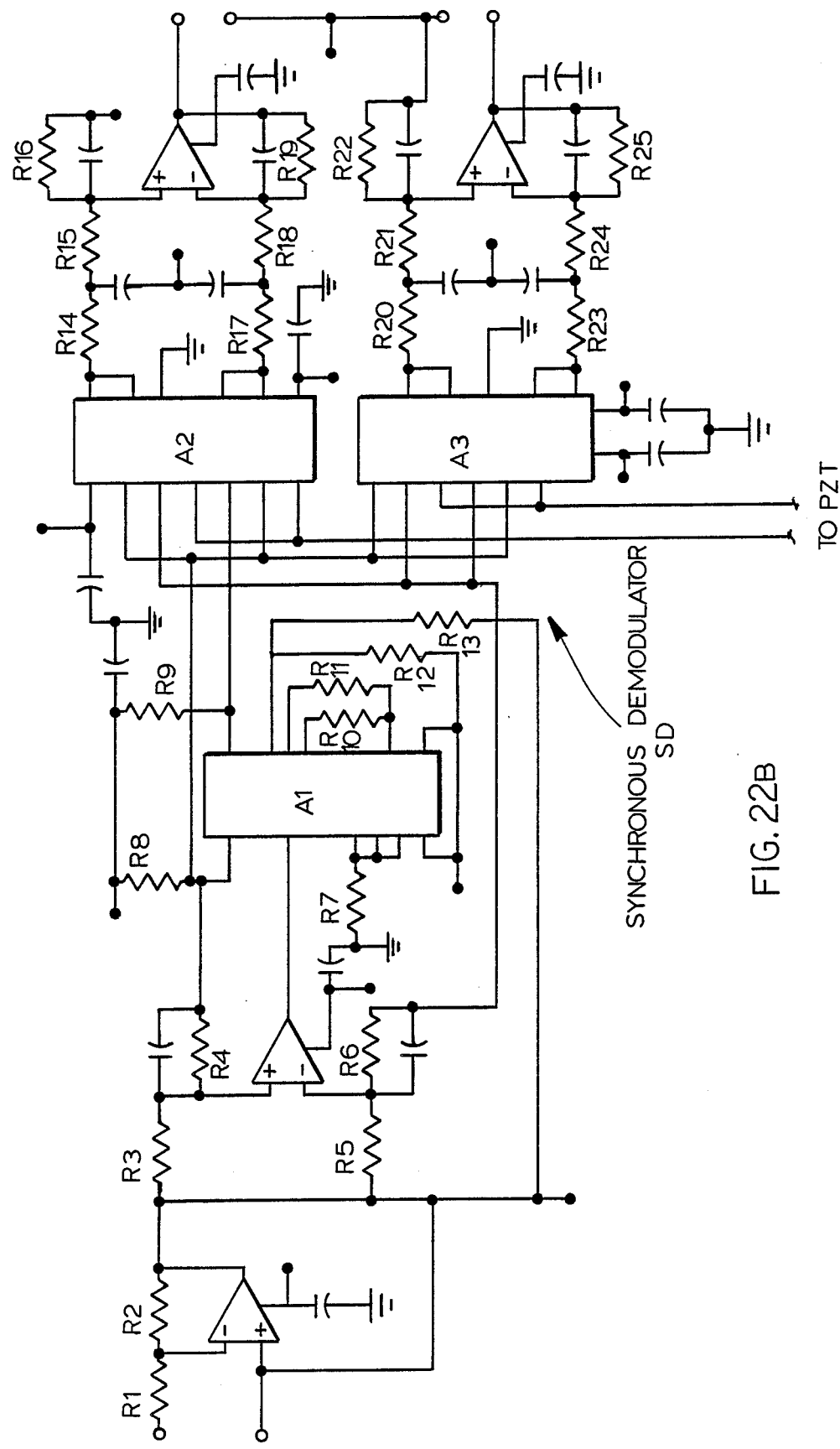
FIG. 22 illustrates the PZT driver circuit that produces the reference signals needed to operate the synchronous demodulator.
Figure 22A:
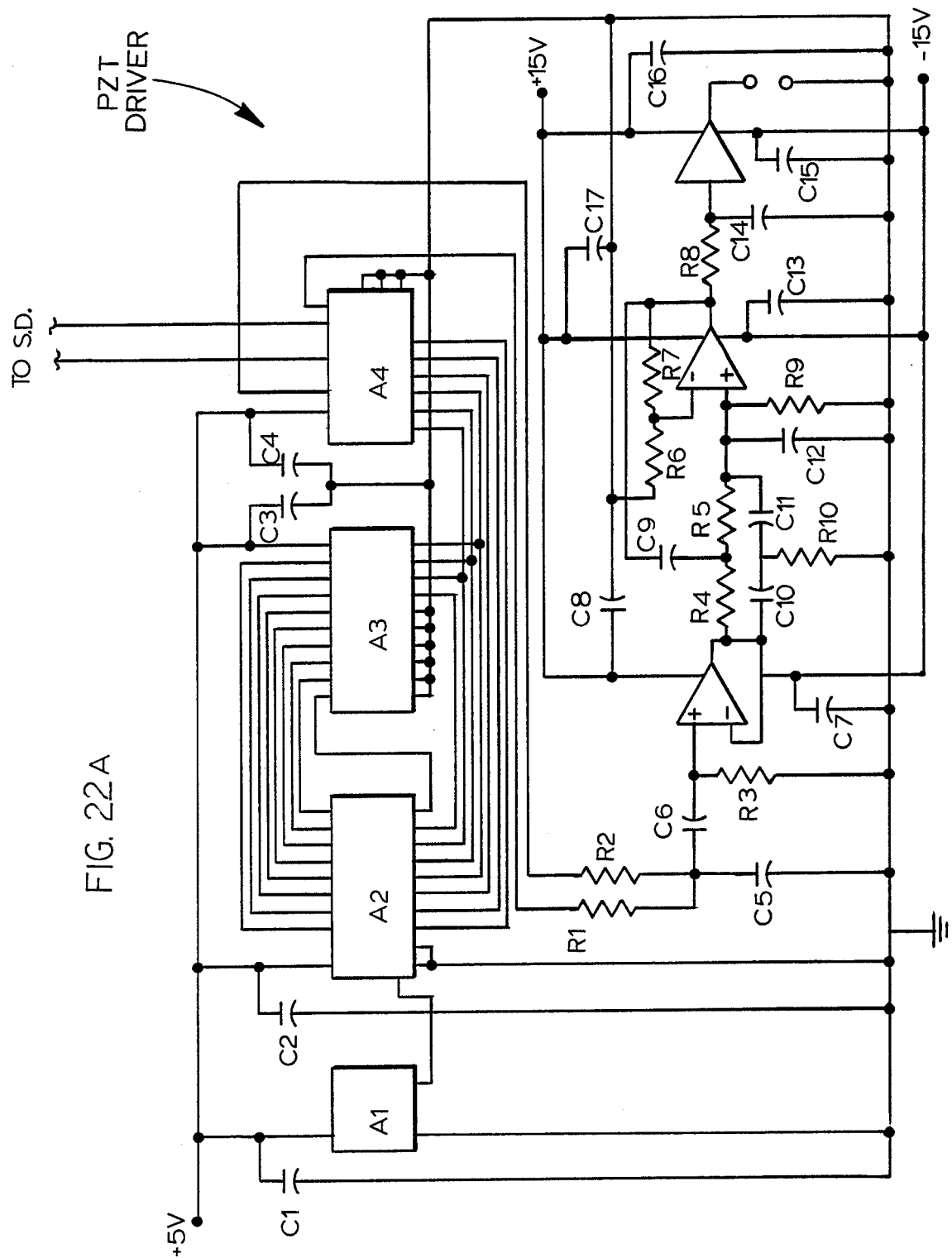

Referring to FIGS. 22A and 22B a PZT driver circuit produces the reference signals needed to operate the synchronous demodulator SD as well as the sine wave needed to generate the optical phase dither with the PZT. A crystal oscillator operates at 24 times the desired drive frequency and feeds into a register and PROM and then a buffer. The two references are generated in the PROM and sent to the demodulator. The first harmonic of the square wave is sent through filtering which produces the sine wave needed to drive the PZT. The synchronous demodulator DM takes the signal after filtering and amplifies it, splits it into two signals 180° out of phase synchronously switches these signals with the references generated in the PZT driver and then filters and amplifies the signals both in phase and 90° out of phase to give a DC output proportional to the input signals peak amplitude. In this way a rotational output is produced which can be utilized by the oil crew to determine the orientation of the drill hole adjacent the drill head.

Thus there has been shown and described novel earth rotation sensor which fulfills all of the objects and advantages sought therefor. Many changes, modifications, variations and other uses and applications of the subject invention will, however, become apparent to those skilled in the art after considering this specification and the accompanying drawings. All such changes, modifications, alterations and other uses and applications which do not depart from the spirit and scope of the invention are deemed to be covered by the invention which is limited only by the claims which follow.

What is claimed is:

1. A fiber optic gyro, comprising:
  (a) a light source means for producing a first beam of light;
  (b) a first beam splitting means for receiving the first beam of light having a photodetector means connected to one output for monitoring the light source output and a polarizing means connected to the other output for polarizing the first light beam;
  (c) a second beam splitting means connected to the polarizing means for splitting the first beam of light into second and third beams of light and recombining the second and third beams into a fourth beam of light;
  (d) a first phase modulator connected to the second beam splitting means for supplying a harmonic modulation to the second beam of light;
  (e) a second phase modulator symmetrically connected to the second beam splitting means with respect to the first phase modulator for supplying a harmonic modulation to the third beam of light 180 degrees out of phase with the harmonic modulation of the first phase modulator to offset environmental effects;
  (f) an optical fiber loop connected to the first and second phase modulators for directing the second and third beams of light in opposite directions along a path about a predetermined axis about which rotation is be measured in a counterpropagating light path for the second and third light beams;
  (g) a sensing optical fiber wound in a coil about a predetermined axis for establishing the counterpropagating light path about which rotation is to be measured, the optical fiber having first and second ends, and coupling means for applying the second and third beams of light to the first and second fiber ends respectively; and
  (h) a detection means including electrical circuitry means connected to the first beam splitting means for detecting rotation of the fourth light beam recombined at the output of the optical fiber loop.

2. A phase modulator for fiber optic systems, comprising:
  (a) A depolarizing element mounted between dual radially poled annular piezoelectric elements;
  (b) a fiber coil for measuring rotational sensitivity wrapped around the piezoelectric elements such that one-half of the coil is wrapped about each element;
  (c) thermal potting material around the loops of the fiber coil for minimizing thermal gradients between the different loops of the fiber coil; and
  (d) insulation and magnetic shielding means for providing an outer housing to maintain a constant environment for the piezoelectric elements.

3. A fiber optic gyro, comprising:
  (a) a light source means for producing a first beam of light;
  (b) a first beam splitting means for receiving the first beam of light having a photodetector means connected to one output for monitoring the light source output and a polarizing means connected to the other output for polarizing the first light beam;
  (c) a second beam splitting means connected to the polarizing means for splitting the first beam of light into second and third beams of light and recombining the second and third beams into a fourth beam of light;
  (d) a first phase modulator connected to the second beam splitting means for supplying a harmonic modulation to the second beam of light;
  (e) a second phase modulator symmetrically connected to the second beam splitting means with respect to the first phase modulator for supplying a harmonic modulation to the third beam of light 180 degrees out of phase with the harmonic modulation of the first phase modulator to offset environmental effects;
  (f) an optical fiber loop connected to the first and second phase modulators for directing the second and third beams of light in opposite directions along a path about a predetermined axis about which rotation is be measured in a counterpropagating light path for the second and third light beams;
  (g) a sensing optical fiber wound in a coil about a predetermined axis for establishing the counterpropagating light path about which rotation is to be measured, the optical fiber having first and second ends, and coupling means for applying the second and third beams of light to the first and second fiber ends respectively;
  (h) a flipping means connected to the first and second phase modulators for alternately reversing the excitation of the phase modulators to minimize bias drift and offset; and
  (i) a detection means including electrical circuitry means connected to the first beam splitting means for detecting rotation of the fourth light beam recombined at the output of the optical fiber loop.

4. A fiber optic gyro as recited in claim 3 wherein the flipping means is generally comprised of a switch driven by an oscillating means for reversing the phase of the demodulating signal connected thereto.

5. A fiber optic gyro, comprising:
   (a) a light source means for producing a first beam of light;
   (b) a variable attenuating means for receiving the first beam of light and amplitude modulating the first beam of light;
   (c) a first beam splitting means for receiving the attenuated first beam of light having a photodetector means connected to one output for monitoring the light source output and a polarizing means connected to the other output for polarizing the first light beam;
   (d) a second beam splitting means connected to the polarizing means for splitting the first beam of light into second and third beams of light and recombining the second and third beams into a fourth beam of light;
   (e) a first phase modulator connected to the second beam splitting means for supplying a harmonic modulation to the second beam of light;
   (f) a second phase modulator symmetrically connected to the second beam splitting means with respect to the first phase modulator for supplying a harmonic modulation to the third beam of light 180 degrees out of phase with the harmonic modulation of the first phase modulator to offset environmental effects;
   (g) an optical fiber loop connected to the first and second phase modulators for directing the second and third beams of light in opposite directions along a path about a predetermined axis about which rotation is be measured in a counterpropagating light path for the second and third light beams;
   (h) a sensing optical fiber wound in a coil about a predetermined axis for establishing the counterpropagating light path about which rotation is to be measured, the optical fiber having first and second ends, and coupling means for applying the second and third beams of light to the first and second fiber ends respectively; and
   (i) a detection means including electrical circuitry means connected to the first beam splitting means for detecting rotation of the fourth light beam recombined at the output of the optical fiber loop.

6. A fiber optic gyro as recited in claim 5 wherein the variable attenuating means is generally comprised of a coupler having an oscillator connected thereto for amplitude modulating the first light beam from the light source.

7. A fiber optic gyro as recited in claim 5 wherein the variable attenuating means is generally an oscillator connected to the first beam splitter means to amplitude modulate the splitting ratio of the beamsplitter.

8. A fiber optic gyro as recited in claim 5 wherein the variable attenuating means is generally comprised of piezoelectric material connected to a fiber transmitting the first beam of light to distort the fiber causing amplitude modulation of the first light beam.

9. A fiber optic gyro as recited in claim 5 wherein the variable attenuating means is generally comprised of a pair of electrodes in close proximity to a fiber for transmitting the the first light beam and coated with an electrostrictive material such the the fiber is driven by a voltage source causing microbending that induces amplitude modulation of the first light beams.

10. A fiber optic gyro as recited in claim 9 wherein the electrostrictive material is generally lithium niobate.

11. A fiber optic gyro and inertial guidance system for determining downhole azimuth of a drilling axis, comprising:
   (a) a housing adapted to be mounted within a drill string of earth drilling apparatus and containing therein;
   (b) a light source means for producing a first beam of light;
   (c) a variable attenuating means for receiving the first beam of light and amplitude modulating the first beam of light;
   (d) a first beam splitting means for receiving the first beam of light having a photodetector means connected to one output for monitoring the light source output and a polarizing means connected to the other output for polarizing the first light beam;
   (e) a second beam splitting means connected to the polarizing means for splitting the first beam of light into second and third beams of light and recombining the second and third beams into a fourth beam of light;
   (f) a first phase modulator connected to the second beam splitting means for supplying a harmonic modulation to the second beam of light;
   (g) a second phase modulator symmetrically connected to the second beam splitting means with respect to the first phase modulator for supplying a harmonic modulation to the third beam of light 180 degrees out of phase with the harmonic modulation of the first phase modulator to offset environmental effects;
   (h) an optical fiber loop connected to the first and second phase modulators for directing the second and third beams of light in opposite directions along a path about a predetermined axis about which rotation is be measured in a counterpropagating light path for the second and third light beams;
   (i) a sensing optical fiber wound in a coil about a predetermined axis for establishing the counterpropagating light path about which rotation is to be measured, the optical fiber having first and second ends, and coupling means for applying the second and third beams of light to the first and second fiber ends respectively;
   (j) a flipping means connected to the first and second phase modulators for alternately reversing the excitation of the phase modulators to minimize bias drift and offset;
   (k) a depolarizing element connected within the sensing optical fiber for preventing cross polarization and signal fadeout; and
   (l) a detection means connected to the first beam splitting means for detecting rotation of the fourth light beam recombined at the output of the optical fiber loop including electrical circuitry means for measuring the effect of the earth's rotation and thereby measure the inclination of the drilling axis of the drill string.

12. A fiber optic gyro and inertial guidance system for determining downhole azimuth of a drilling axis as recited in claim 11 wherein the sensing optical fiber loop has a generally oblong circular shape.

13. A fiber optic gyro and inertial guidance system for determining downhole azimuth of a drilling axis as recited in claim 11 wherein the flipping means is comprised of a stepping motor connected to a mounting for flipping the sensing optical fiber loop.

14. A fiber optic gyro and inertial guidance system for determining downhole azimuth of a drilling axis as recited in claim 13 wherein a length of polarization preserving fiber is connected at 45 degrees to the polarizing means to scramble the polarization of the first light beam to reduce magnetic field sensitivity.

15. A fiber optic gyro and inertial guidance system for determining downhole azimuth of a drilling axis as recited in claim 14 wherein a depolarizing element is connected in series with the sensing optical fiber loop for maintaining the intensity of the light input.

16. A fiber optic gyro and inertial guidance system for determining downhole azimuth of a drilling axis as recited in claim 15 wherein dual depolarizing elements are symmetrically connected in series with ends of the sensing optical fiber loop for maintaining the intensity of the light input.

17. A fiber optic gyro and inertial guidance system for determining downhole azimuth of a drilling axis as recited in claim 16 wherein the depolarizing elements are generally comprised of two lengths of polarization preserving fiber that are spliced with their birefringent axes at 45 degrees with respect to each other.

18. A fiber optic gyro and inertial guidance system for determining downhole azimuth of a drilling axis as recited in claim 17 wherein the depolarizing elements and phase modulators are constructed into a single unit comprising:

(a) A depolarizing element mounted between dual radially poled annular piezoelectric elements;

(b) a fiber coil for measuring rotational sensitivity wrapped around the piezoelectric elements such that one half of the coil is wrapped about each element;

(c) thermal potting material around the loops of the fiber coil for minimizing thermal gradients between the different loops of the fiber coil; and (d) insulation and magnetic shielding means for providing an outer housing to maintain a constant environment for the piezoelectric elements.

19. A fiber optic gyro and inertial guidance system for determining downhole azimuth of a drilling axis as recited in claim 18 wherein the flipping means is generally comprised of a switch driven by an oscillating means for reversing the phase of the demodulating signal connected thereto.

20. A fiber optic gyro as recited in claim 11 wherein the variable attenuating means is generally comprised of a coupler having an oscillator connected thereto for amplitude modulating the first light beam from the light source.

21. A fiber optic gyro as recited in claim 11 wherein the variable attenuating means is generally an oscillator connected to the first beam splitter means to amplitude modulate the splitting ratio of the beamsplitter.

22. A fiber optic gyro as recited in claim 11 wherein the variable attenuating means is generally comprised of piezoelectric material connected to a fiber transmitting the first beam of light to distort the fiber causing amplitude modulation of the first light beam.

23. A fiber optic gyro as recited in claim 11 wherein the variable attenuating means is generally comprised of a pair of electrodes in close proximity to a fiber for transmitting the the first light beam and coated with an electrostrictive material such the the fiber is driven by a voltage source causing microbending that induces amplitude modulation of the first light beams.

24. A fiber optic gyro as recited in claim 23 wherein the electrostrictive material is generally lithium niobate.

* * * * *